United States Patent Office 3,411,882
Patented Nov. 19, 1968

3,411,882
PRODUCTION OF BORON NITRIDE
Helmut Knorre, Hainstadt (Main), and Gerhard Kuhner, Gross-Auheim, Germany, assignors to Deutsche Gold- und Silber-Scheideanstalt vormals Roessler, Frankfurt am Main, Germany
No Drawing. Filed Feb. 17, 1967, Ser. No. 616,763
Claims priority, application Germany, Feb. 19, 1966, D 49,401
4 Claims. (Cl. 23—191)

ABSTRACT OF THE DISCLOSURE

Process for the production of boron nitride comprising reacting alkali metal borates or mixtures of an alkali metal oxide and alkali metal borates or boron trioxide with silicon and/or aluminum or their alloys in contact with nitrogen, or nitrogen yielding gases, such as ammonia, at a temperature between 200 and 1200° C. and leaching the reaction mixture with water to dissolve out the water soluble alkali metal salts.

BACKGROUND OF THE INVENTION

Field of the invention

The present invention concerns a process for the production of boron nitride by reaction of boron compounds with nitrogen containing substances.

Description of the prior art

Essentially three principal ways for the production of boron nitride are known:

(a) Its production from the elements which is costly as the production of elemental boron is expensive and the nitriding of boron even at very high temperatures cannot be carried out quantitatively.

(b) The reaction of boron halides and ammonia which while leading to very pure products also leads to very finely divided amorphous products which, for example, are only poorly suited or not at all suited for the production of shaped bodies. In addition, in view of their finely divided state, they hydrolyze easily. A further disadvantage of this method is that the corresponding boron halides must first be prepared in a preliminary step.

(c) The reaction of oxygen containing boron compounds with ammonia, ammonium compounds or other nitrogen containing substances. This is presently the most generally used method. In some instances tertiary calcium phosphate is added to loosen the reaction mixture and also in some instances carbon is added to bind the oxygen and prevent strong sintering.

All of these methods, however, have the disadvantage that in the first step they lead to only very impure boron nitride and that such product must be subjected to a number of rather costly aftertreatment steps in order to achieve the necessary degree of purity. Furthermore, technical processing difficulties are encountered when such syntheses are carried out on a large commercial scale, for instance, some proceed with liberation of $H_2O$ or require a precompacting of the material. Also, in general, the temperatures employed lie over 1200° C. whereby, naturally, special prerequisites are provided with respect to the construction material of the furnaces.

SUMMARY OF THE INVENTION

The present invention concerns a process for the production of boron nitride which is simple to carry out and leads to a product especially suited for the production of shaped bodies. According to the invention, alkali metal borates or mixtures of alkali metal oxide and alkali metal borates or boron trioxide are reacted with silicon and/or aluminum or their alloys in the presence of nitrogen or nitrogen yielding gases, such as ammonia, at temperatures between 200 and 1200° C. to produce a boron nitride and water soluble alkali metal salt mixture from which high percentage boron nitride can be recovered by leaching with water to dissolve out the water soluble alkali metal salts.

DETAILED DESCRIPTION OF INVENTION INCLUDING PREFERRED EMBODIMENTS THEREOF

The process according to the invention is, for instance, based upon reactions according to the following equations:

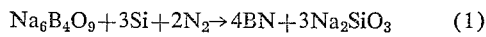
$$Na_6B_4O_9 + 3Si + 2N_2 \rightarrow 4BN + 3Na_2SiO_3 \qquad (1)$$

or respectively

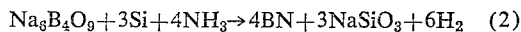
$$Na_8B_4O_9 + 3Si + 4NH_3 \rightarrow 4BN + 3NaSiO_3 + 6H_2 \qquad (2)$$

The production of the starting borate $Na_6B_4O_9$, for example, can be effected in situ according to the following equations:

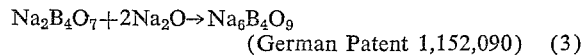
$$Na_2B_4O_7 + 2Na_2O \rightarrow Na_6B_4O_9$$
$$\text{(German Patent 1,152,090)} \qquad (3)$$

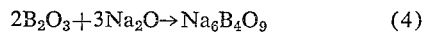
$$2B_2O_3 + 3Na_2O \rightarrow Na_6B_4O_9 \qquad (4)$$

In view of the reactivity of silicon and aluminum with nitrogen with formation of the corresponding nitrides and also in view of the expected formation of silicon borides and aluminum borides, it is surprising that the boron nitride produced according to the invention is not contaminated with these substances.

Powdered silicon or aluminum or high percentage alloys thereof are used to bind the oxygen in the reaction according to the invention. The alkali metal borates or mixtures of alkali metal oxide with alkali metal borates or boron trioxide are so selected that the $Me_2^IO:B_2O_3$ ratio provided thereby is sufficient that during the reaction with the reducing agents such as the silicon and/or aluminum water soluble alkali metal silicates or respectively alkali metal aluminates are formed.

When silicon is used as the reducing agent the $Me_2^IO:B_2O_3$ ratio preferably is 3:2 as in Equations 1 and 2 above. The alkali metal borate $Na_6B_4O_9$ in addition to being preparable according to Equations 3 and 4 also may be prepared by boiling down an aqueous solution of sodium tetraborate and NaOH and calcining the product according to the following equation:

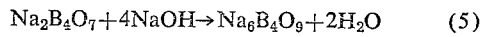
$$Na_2B_4O_7 + 4NaOH \rightarrow Na_6B_4O_9 + 2H_2O \qquad (5)$$

However, when aluminum is used as the reducing agent it is preferable to use sodium metaborate according to the following equation:

$$NaBO_2 + Al + \tfrac{1}{2}N_2 \rightarrow BN + 2NaAlO_2 \qquad (6)$$

Expediently, the reducing agent employed to bind the oxygen is employed in a quantity of 2–20% below that theoretically required to react with alkali metal borate or the alkali metal oxide, alkali metal borate or boron trioxide mixtures in order to ensure a complete reaction thereof to water soluble salts. The reactants are finely ground in order that the reaction proceed as quantitatively as possible.

Expediently, the oxygen binding agent is finely ground in a ball mill whereafter the required alkali metal borate or $Na_2O$ and borate or boron trioxide containing mixture is added and also finely ground while simultaneously effecting a thorough mixture of the reaction partners. The reaction of the resulting mixture with nitrogen is best carried out in a reaction tube or tunnel furnace or flat pans or flat boats. The reaction tube can be heated up externally in the required manner or the reaction mixture can be passed slowly through correspondingly heated reaction zones.

Preferably the heating of the reaction mixture is effected in such a manner that it is heated in about 3 hours to a temperature of about 650–750° C. The mixture is then kept at this temperature for some time (about 2–10 hours) and then heated to about 1100° C. in about 2 hours. Thereafter it is allowed to cool down in a nitrogen atmosphere and the cooled mixture processed.

Pure nitrogen or ammonia gas are preferably used as the source of nitrogen. The ammonia preferably should be used in the form of a gas stream in order to carry off the hydrogen formed during the reaction.

Advantageously an apparatus of the following type can be employed for carrying out the process according to the invention. Such apparatus consists of a tube of refractory material inserted in a horizontal electric tube furnace in which the finely powdered reaction mixture is reacted in loosely poured form in boats under a stream of nitrogen or ammonia. The tube is closed at one end except for a gas inlet tube and a thermo protective tube. The other end of the tube is closed off with a flanged lid which carries a somewhat larger gas outlet tube. Two gas filter towers are connected to such outlet tube in order to be able to separate off dust entrained from the reaction mixture. Two dry gas meters at the inlet and outlet ends respectively of the apparatus permit a check of the gas consumption and observation of the progress of the reaction.

The following examples will serve to illustrate the process according to the invention with reference to several preferred embodiments thereof.

EXAMPLE 1

Finely ground borax glass ($Na_2B_4O_7$) and sodium monoxide ($Na_2O$) were thoroughly mixed in a molar ratio of 1:2 and the mixture placed in iron boxes and reaction therein initiated by short heating at one spot with a Bunsen burner. The exothermic reaction propagated itself throughout the entire reaction mixture whereby the reaction product ($Na_6B_4O_9$) sintered to a compact salt bar. After cooling under exclusion of moisture such starting borate was given a preliminary comminution in a hammer mill.

The 325 g. of thus pre-comminuted $Na_6B_4O_9$ were then placed in a porcelain ball mill together with 75 g. of silicon and milled therein until the particle size of the resulting ground mixture was at least $<5\pi$ and that such mixture was completely homogeneous (about 2–4 hours). The quantity of silicon employed was 15% below that required according to Equation 1.

Such reaction mixture was then heated in boats under a light stream of ammonia in two steps, in the first of which it was heated slowly within about 3 hours to about 750° C. and held at this temperature for about 2 hours. At this point about ⅓ of the nitrogen required for the formation of the desired boron nitride had been bound. In order to complete the reaction and to obtain the boron nitride produced in a crystallineless hydrolysable form the reaction mixture was slowly heated in a second stage to about 1100° C. and held at this temperature (3–10 hours) until the nitrogen take up ceased. Soon after the maximum temperature was reached a strong reduction in the nitrogen take up was noticeable which indicates that the end of the reaction was being approached.

When ammonia is used as in the present instance the initiation of the reaction can be recognized in that more gas leaves the reaction tube than is supplied or hydrogen is liberated therefrom according to the following equation:

$$2NH_3 \rightarrow N_2 + 3H_2 \tag{7}$$

As can be seen from such equation, upon complete reaction of the ammonia 3/2 mol of hydrogen are liberated per mol of ammonia. The gas ratios of $NH_3:H_2$ therefore are 2:3. At higher temperatures, however, the cleavage of ammonia into nitrogen and hydrogen independently of the reaction must be taken into consideration. After the reaction was completed, the reaction mixture was allowed to cool under a stream of nitrogen.

The crude product was a more or less strongly sintered white to yellowish green mass which, however, could be removed without difficulty from conical boats.

The sintered crude product was comminuted in a hammer mill in order to facilitate the leaching of the impurities therefrom during its subsequent purification. It was then introduced into distilled water (about 100 g. crude product per liter of water) and heated while stirred for 2 hours at about 80° C. The sodium silicate formed as by-product went into solution and was filtered off from the insoluble boron nitride. To ensure complete removal of the sodium silicate, the filter cake was again stirred with distilled water and refiltered.

Thereafter the alkali metal free filter cake was heated in dilute HCl (1:1) for about 4 hours at 60° C. (about 100 g. filter cake per liter of dilute HCl) in order to remove the difficultly soluble trimetal hydroxide, especially $Fe(OH)_3$ from the boron nitride. Thereafter the product was filtered and washed acid free and the major portion of the adhering water displaced by methanol and then dried in a vacuum drying cupboard (50 mm. Hg.) at 150° C. (about 16 hours) in order to insure that hydrolysis did not occur.

The resulting purified boron nitride was a white to ivory colored talcum like product.

Analogous results were obtained when nitrogen was employed as the source of nitrogen instead of ammonia.

Chemical analysis of the products gave the following results.

(a) When $NH_3$ was used:

43.49% B=99.4% of theory<0.1% Si
55.7% N=99% of theory<0.01% Fe (b) When nitrogen was used:

43.49% B=99.4% of theory<0.12% Si
54.56% N=96.9% of theory<0.014% Fe

The yield of boron nitride on the silicon supplied was always over 90% of theory.

Both products a and b were suited for the production of shaped bodies. Compacts produced in a hot compression mold had a density of over 2.1 g./cm.³ (theory 2.2 g./cm.³).

The boron nitride product also was suited as a lubricant stable at high temperatures.

EXAMPLE 2

201 g. of water free sodium tetraborate and 120 g. of aluminum powder were ground in a ball mill and thereafter 62 g. of finely ground $Na_2O$ added thereto and the mixture ground further until a homogeneous mixture of a grain size less than $5\mu$ was obtained. Such mixture was then processed analogously to that of Example 1. However, in contrast to Example 1, the reaction was strongly exothermic after it was initiated by warming to about 200° C. After the exothermic reaction had died down the reaction mixture was also heated to 1100° C. for about 2–3 hours to complete the reaction. The crude product in this instance was essentially composed of boron nitride and sodium aluminate. The processing of the crude product to a purified product was analogous to that of Example 1.

EXAMPLE 3

Boron trioxide and sodium monoxide were reacted in the same manner as the borax glass and sodium monoxide in Example 1 to produce $Na_6B_4O_9$ which was then ground and mixed with silicon and reacted with ammonia as described in Example 1 to produce essentially the same product.

What is claimed is:

1. A process for the production of boron nitride which comprises reacting an intimate mixture of (1) a material selected from the group consisting of alkali metal borates, mixtures of alkali metal borates and alkali metal monoxides and mixtures of boron trioxide and alkali metal monoxides and (2) a metal selected from the group consisting of silicon and aluminum in elemental form in contact with a gas selected from the group consisting of nitrogen and ammonia to a temperature between about 200 and 1200° C. to effect a reaction of the reaction mixture to form a product containing boron nitride and water soluble alkali metal compounds of the metal employed.

2. The process of claim 1 in which the ratio of $Me_2^IO:B_2O_3$ in said material (1) and the quantity thereof is such that when reacted with the metal (2) the latter is completely converted to a water soluble compound selected from the group consisting of water soluble alkali metal silicates and water soluble alkali metal aluminates is formed.

3. The process of claim 2 in which said material (1) is $Na_6B_4O_9$ and said metal (2) is silicon.

4. The process of claim 2 in which said material (1) is $NaBO_2$ and said metal (2) is aluminum.

References Cited

UNITED STATES PATENTS

| | | | |
|---|---|---|---|
| 1,077,712 | 11/1913 | Heyer | 23—191 |
| 2,974,013 | 3/1961 | Litz | 23—191 |
| 3,208,824 | 9/1965 | Lipp | 23—191 |
| 3,261,666 | 7/1966 | Luberoff | 23—191 |

OSCAR R. VERTIZ, *Primary Examiner.*

G. PETERS, *Assistant Examiner.*